(12) United States Patent
Nefzer et al.

(10) Patent No.: US 10,960,735 B2
(45) Date of Patent: *Mar. 30, 2021

(54) CABIN AIR FILTER AND FILTER ASSEMBLY

(71) Applicant: MANN+HUMMEL GmbH, Ludwigsburg (DE)

(72) Inventors: Markus Nefzer, Ludwigsburg (DE); Torsten Fritzsching, Vaihingen (DE); Mario Rieger, Ludwigsburg (DE); Dominik Haider, Gottfrieding (DE); Stephan Kessler, Reisbach (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,252

(22) Filed: Jul. 24, 2019

(65) Prior Publication Data

US 2019/0344641 A1 Nov. 14, 2019

Related U.S. Application Data

(63) Continuation of application No. 15/178,575, filed on Jun. 10, 2016, now Pat. No. 10,391,841, which is a continuation of application No. PCT/EP2014/077178, filed on Dec. 10, 2014.

(30) Foreign Application Priority Data

Dec. 10, 2013 (DE) .................... 10 2013 020 382.1

(51) Int. Cl.
*B60H 3/06* (2006.01)
*B01D 46/00* (2006.01)
*B01D 46/10* (2006.01)

(52) U.S. Cl.
CPC ....... *B60H 3/0616* (2013.01); *B01D 46/0005* (2013.01); *B01D 46/10* (2013.01); *B01D 2265/021* (2013.01); *B01D 2265/028* (2013.01); *B01D 2279/40* (2013.01); *B60H 2003/065* (2013.01)

(58) Field of Classification Search
CPC  B01D 46/0002; B01D 46/0005; B01D 46/10; B01D 2265/028; B01D 2279/40; B01D 2265/021; B60H 2003/065
See application file for complete search history.

(56) References Cited

U.S. PATENT DOCUMENTS 10,391,841 B2 *  8/2019  Nefzer ................... B01D 46/10

* cited by examiner

*Primary Examiner* — Robert Clemente
(74) *Attorney, Agent, or Firm* — James Hasselbeck

(57) ABSTRACT

A cabin air filter is provided with a filter medium and a filter element frame that frames the filter medium and is configured to attach the cabin air filter to a filter housing. The filter element frame is provided with at least one engagement element configured to engage pivotably at least one receiving element of the filter housing for pivoting the cabin air filter relative to the filter housing about a pivot axis. The filter element frame also has at least one snap hook that locks with at least one locking element of the filter housing for blocking pivoting of the cabin air filter relative to the filter housing at least in a first direction about the pivot axis.

8 Claims, 4 Drawing Sheets

CABIN AIR FILTER AND FILTER ASSEMBLY

This application is a continuation of U.S. patent application Ser. No. 15/178,575, filed 10 Jun. 2016, which is a continuation of international application No. PCT/EP2014/077178 having an international filing date of 10 Dec. 2014 and designating the United States, the International Application claiming a priority date of 10 Dec. 2013, based on prior filed German patent application No. 10 2013 020 382.1, the entire contents of the aforesaid US patent application, the international application and the aforesaid German patent application being incorporated herein by reference.

TECHNICAL FIELD

Background of the Invention

The present invention concerns a filter element, in particular a cabin air filter for filtering air for the cabin of a motor vehicle or building. Moreover, the invention concerns a filter assembly with such a filter element and with a filter receptacle.

Even though applicable to any type of filter element and filter assembly, the present invention as well as the underlying problems will be described in the following for a cabin air filter of a motor vehicle.

Increasing air pollution, in particular in metropolitan areas, in combination with the use of modern air-conditioning devices makes it necessary to purify by means of suitable filters the air that is guided from the exterior into the cabin of a motor vehicle and is processed or air-conditioned. For this purpose, for example, particle filters, odor filters or their combinations with each other are conceivable that are to filter out or absorb as much as possible the suspended solids, particles or odors contained in the ambient air. For filtration of air for the cabin of a motor vehicle, folded or pleated filter materials, for example, filter nonwovens that form a fold pack, are often employed. For this purpose, first a flat filter material sheet is folded in a zigzag shape. The fold pack is secured by side strips and head strips or another type of frame. Such filter elements can be fixed exchangeably in a filter receptacle. The thus produced filter assembly can be installed in an air conditioning device of an appropriate motor vehicle.

An object of the present invention resides in providing an improved filter element. The improved filter element is to be characterized by a simple installation in and removal from a corresponding filter receptacle.

SUMMARY OF THE INVENTION

Accordingly, a filter element with a filter medium and a filter element frame for attachment of the filter element on or in a filter receptacle is provided. The filter element frame includes at least one engagement element and at least one snap hook. The at least one engagement element is configured to engage pivotably a receiving element of the filter receptacle for pivoting of the filter element relative to the filter receptacle about the pivot axis. The at least one snap hook is configured to lock with at least one locking means (locking element) in the filter receptacle for blocking pivoting of the filter element relative to the filter receptacle at least in a first direction about the pivot axis.

Advantageously, the filter element can be mounted and demounted without use of auxiliary tools. For assembly, first the at least one engagement element is brought into engagement with the at least one receiving element in order to define in this way a pivot axis. Subsequently, the filter element is pivoted about the pivot axis until the at least one snap hook locks with the at least one locking means. The "locking action" is to be understood as an elastic form fit engagement which is generated in that the snap hook passes across the locking means, is elastically deformed thereby, and thus snaps in place behind the locking means. For disassembly, the at least one snap hook must only be disengaged from the at least one locking means. Subsequently, the filter element can be pivoted about the pivot axis relative to the filter receptacle. Finally, the at least one engagement element can be disengaged from the receiving element. Subsequently, the filter element can be exchanged. The force expenditure for actuation of the snap hook is advantageously also minimal.

The filter element frame, in particular together with the at least one engagement element and/or the at least one snap hook, can be injection-molded onto the filter medium. The filter element frame can be, for example, of a rectangular or of a trapezoidal shape.

According to one embodiment, the at least one engagement element is a guide element and the at least one receiving element is a guide recess. The guide element can be, for example, designed as a pin and the guide recess as a matching groove. By using a combination of guide element/ guide recess, a defined engagement of filter element and filter receptacle can be realized in a simple way. Also, in this way the pivot axis can thus be defined in a simple way.

The engagement element can have a labyrinth-type configuration. Such a configuration is easily removable from an injection mold. In particular manufacture of the engagement element or of the filter element frame in a simple open/close two-plate tool is enabled in this way. Also, the labyrinth-type configuration is material-saving. Moreover, the engagement element may have a projection which defines a maximally possible pivot position of the filter element relative to the filter receptacle.

According to a further embodiment, the guide recess is open at one end for insertion of the guide element into it and at the other end is of a closed configuration for defining the pivot axis together with the guide element. An appropriate closed area has in particular a curved guide surface along which the guide element glides in order to define the pivot axis in this way.

According to a further embodiment, the at least one snap hook is designed to snap in place behind the at least one locking means upon pivoting of the filter element about the pivot axis in a second direction opposite to the first direction. Release of the connection between snap hook and locking means is then realized in that the snap hook is elastically deformed and is moved across the locking means in the first direction.

According to further embodiment, the filter element frame has two longitudinal profiles arranged parallel to each other and two transverse profiles arranged parallel to each other and extending perpendicular to the longitudinal profiles, and wherein the at least one engagement element is provided on one of the transverse profiles. The at least one engagement element can project in particular perpendicularly away from the corresponding transverse profile.

According to a further embodiment, the filter element includes two engagement elements, of which one is provided on one of the transverse profiles, respectively. The pivot axis can be generated in a simple way by two engagement elements which each engage a corresponding receiving element of the filter receptacle (filter housing).

According to a further embodiment, the at least one snap hook is provided on one of the longitudinal profiles. The at least one snap hook can be designed in particular in an L shape. On the long leg of the "L", a projection can be formed which is designed to snap in place across the locking means. The projection can be provided with an insertion ramp.

According to a further embodiment, two snap hooks are provided which are provided on a common longitudinal profile. In this way, the filter element can be attached in a reliable way to the filter receptacle. A respective snap hook locks then behind a respectively associated locking means. In an alternative embodiment, the snap hooks could also be provided on one of the transverse profiles.

Preferably, the at least one snap hook and the at least one engagement element are formed on opposite end sections of the filter element or of the filter element frame.

According to a further embodiment, on the filter element frame at least one groove is provided which is designed such that a web of the filter receptacle engages therein. For example, two, three, four or more such grooves and a corresponding number of webs can be provided. The grooves can be in particular formed on a longitudinal profile or transverse profile.

The grooves can be spaced apart from each other at different spacings. For example, the spacing between a first groove and a second groove can be greater than the spacing between the second groove and a third groove. The webs are then arranged correspondingly. In this way, a poka-yoke effect is achieved. In other words, in this way mounting of a wrong filter receptacle or of a filter receptacle of the wrong type can be prevented.

Moreover, a filter assembly including a filter element as described above and further including a filter receptacle (filter housing), in or to which the filter element is fastened, is provided.

For example, the filter receptacle (filter housing) can be designed to hold the filter element in such a way that the plane in which the filter element is areally extending is vertically oriented.

The filter element and/or the filter assembly are preferably employed in a truck, in particular for filtration of the cabin air for the driver's cabin of the truck. The filter receptacle can be provided to be attachable to a partition panel of the truck in such a way that the filter element is oriented vertically.

The filter element includes, for example, a filter medium and one or several reinforcement elements, in particular side bands and/or head bands, which at least over sections thereof reinforce the filter medium in order to maintain its shape, in particular when in use in a filtering operation. The reinforcement elements can form in particular a closed or open frame, even a monolithic frame, which surrounds the filter medium. According to a definition applicable herein, a "frame" includes one or several reinforcement elements.

The reinforcement elements can be connected by material fusion, in particular adhesively, with the filter medium at the edges. For this purpose, the reinforcement elements can be heated and the filter medium can be pressed into the heated material. Alternatively, the reinforcement elements can be injection-molded onto the filter medium. Moreover, an adhesive can be used as an auxiliary material. The reinforcement elements themselves can be made of the same material as the filter medium. Alternatively, the reinforcement elements can be designed as injection-molded plastic parts. The reinforcement elements can be stiff or flexible.

The filter medium can be folded or corrugated. Folds are known as zigzag or W folds, for example. The filter medium can be embossed and subsequently can be folded to a pointed edge at the embossed edges. As a starting material, a flat filter sheet material can be provided which is correspondingly reshaped. The filter medium is a filter fabric, a laid filter material, or a nonwoven filter material, for example. In particular, the filter medium can be produced by a meltblown method. The filter medium can include natural fibers such as cotton or synthetic fibers, for example, of polyester, polyphenylene sulfide or polytetrafluoroethylene. The fibers can be oriented during processing inwardly, slantedly and/or transverse to the machine direction.

A corresponding filter material serves for filtration of air, fluid, i.e., gaseous and/or liquid media, for example, air. Gaseous fluid or air encompasses here also mixtures of gas or air with solids or mixtures of gas or air with liquid. For example, an air conditioning device may include the filter element. The filter element can include a sealing device which seals a raw side correlated with the filter element relative to a clean side of the filter element. The sealing device can be embodied to be the same component as one or several reinforcement elements of the filter element. Alternatively, the sealing device can be formed as an additional component. Accordingly, the sealing device can be attached, for example, to the filter medium, to one or several reinforcement elements, to the filter element or to the filter receptacle.

The features described for the filter element apply likewise to the filter assembly and vice versa.

Further possible implementations of the invention include also combinations, not explicitly mentioned, of features or method steps of the embodiments described above or in the following. In this context, a person of skill in the art will add individual aspects as improvements or supplements to the respective basic form of the invention.

Further embodiments of the invention are subject matter of the dependent claims as well as of the embodiments of the invention described in the following. In the following, the invention will be explained in more detail with the aid of embodiments with reference to the attached Figures.

BRIEF DESCRIPTION OF THE DRAWINGS

In the Figures, same or functionally the same elements, inasmuch as nothing to the contrary is indicated, are provided with the same reference characters.

DESCRIPTION OF THE INVENTION

Figures 1, 1A, 1B:
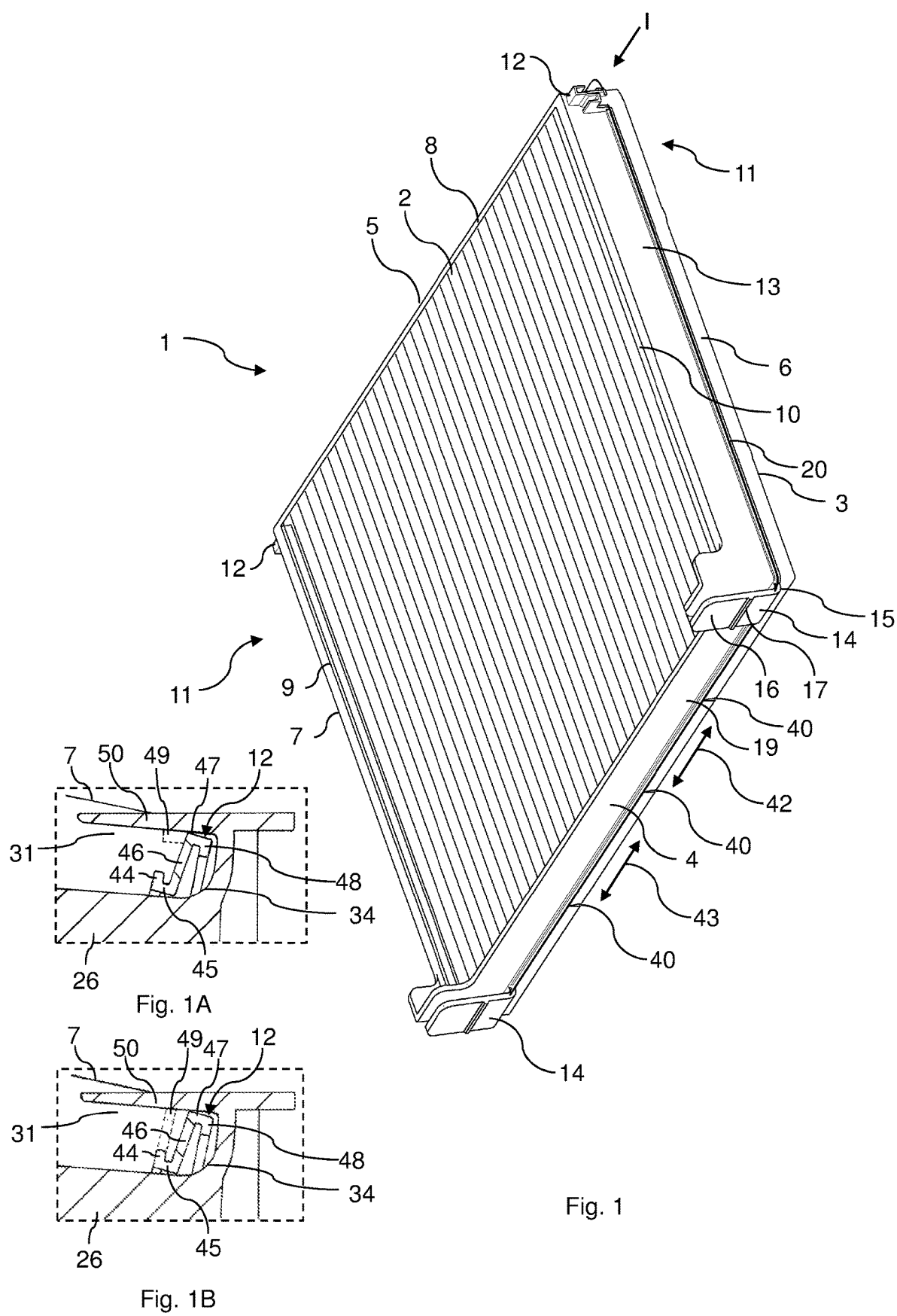
FIG. 1 is a perspective view a cabin air filter according to one embodiment.
FIG. 1A is a view I of FIG. 1 wherein also a filter housing shown in FIG. 2 is partially shown.
FIG. 1B is a variant of FIG. 1A.

FIG. 1 shows a cabin air filter 1. It includes a filter medium 2 which is folded, for example. A zigzag fold pattern is conceivable, for example. A corrugated configuration of the filter medium 2 is possible also. The filter medium 2 can be designed for particle and/or odor filtration.

Moreover, the cabin air filter 1 includes a filter element frame 3. The filter element frame 3 includes a leading longitudinal profile 4 and a rearward longitudinal profile 5 and lateral transverse profiles 6, 7; the longitudinal profiles 4, 5 and the transverse profiles 6, 7 are connected to each other to a rectangle. The filter element frame 3 frames the filter medium 2 which means that the filter medium 2 is connected with its end face edges 8 as well as terminal folds 9, 10 to the filter element frame 3. In particular, the filter element frame 3 can be injection-molded onto the filter medium 2. For this purpose, the filter element frame 3 can be embodied in particular as an injection-molded plastic component.

The transverse profiles 6, 7 each include engagement elements 12 at an end section which is facing the rearward longitudinal profile 5. The engagement elements 12 can project, for example, perpendicularly away from an exterior surface 13 of the transverse profiles 6, 7. For example, the engagement elements 12, as shown in FIG. 1A, can be shaped to have labyrinth-type profiles that can be removed easily from an injection mold for producing the filter element frame 3.

Figure 3:
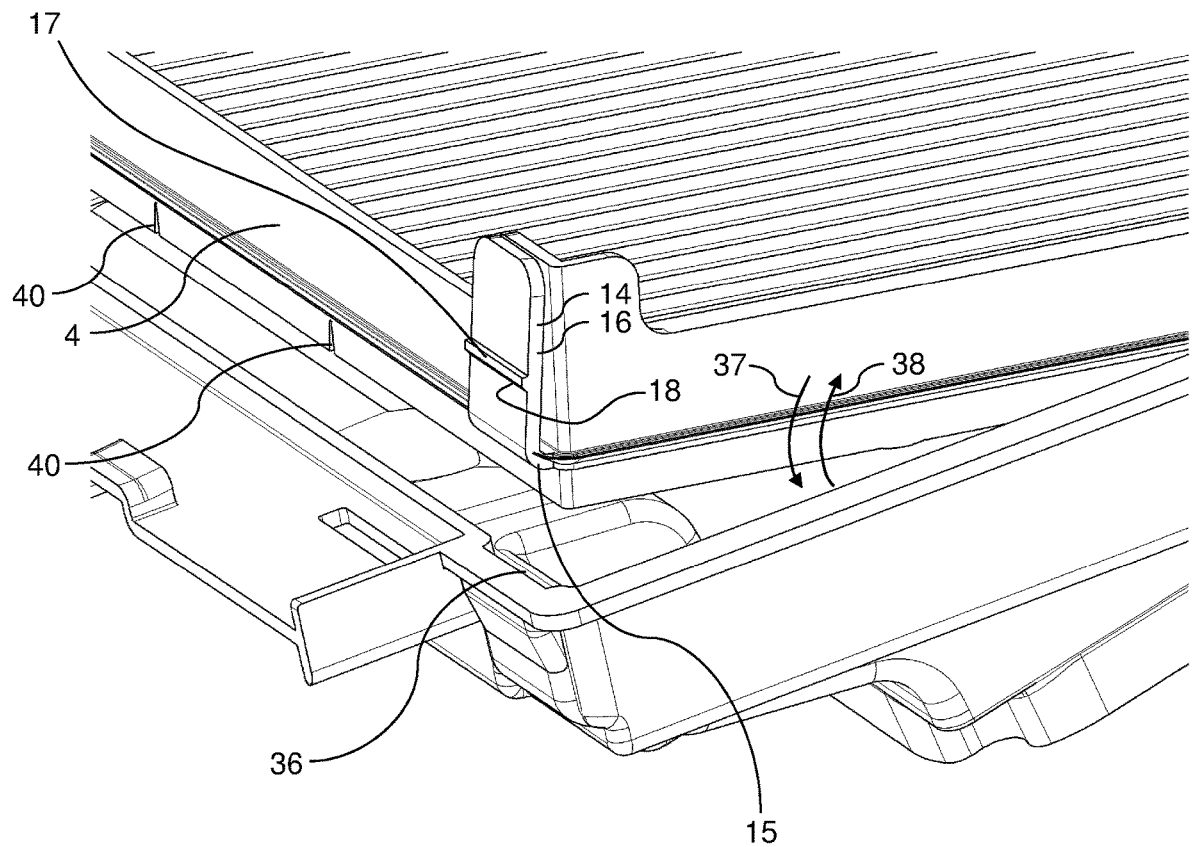
FIG. 3 is a perspective view of a state during insertion of the cabin air filter of FIG. 1 into the filter housing of FIG. 2.

The leading longitudinal profile 4 includes two snap hooks 14. A respective snap hook 14 can be embodied, for example, with an L-shape with a short leg 15 and a long leg 16. For example, the long leg 16 can include a projection 17 that is formed with an insertion ramp 18, as illustrated in FIG. 3. In this context, the legs 16 each extend parallel to an outer surface 19 of the leading longitudinal profile 4.

The filter element frame 3 can moreover include a seal 20 which surrounds completely the filter element frame 3. The seal 20 can be formed as a monolithic component of the filter element frame 3. The seal 20 can be produced in particular by injection molding together with the filter element frame 3 as one piece.

Figure 2:
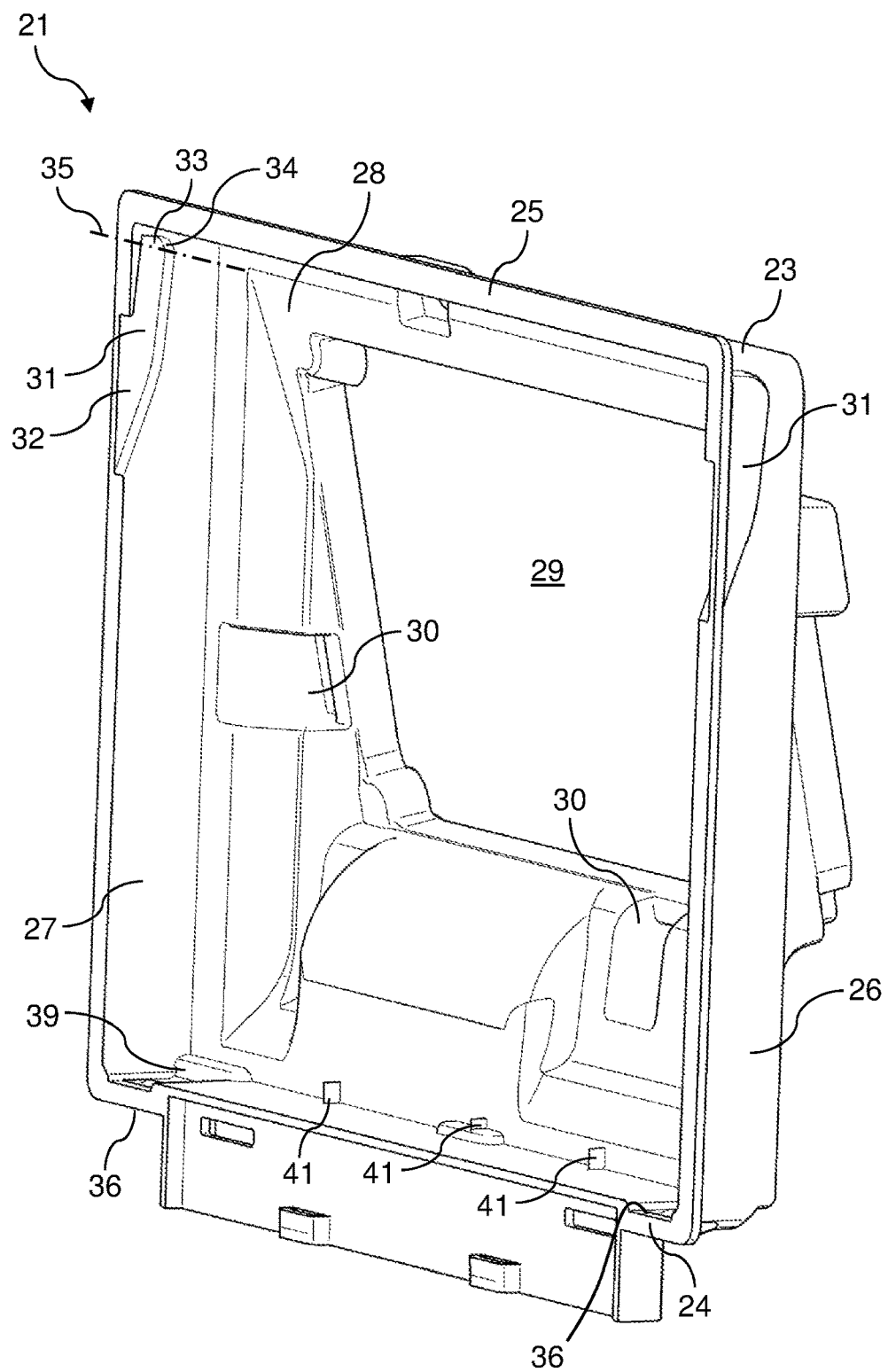
FIG. 2 is a perspective view of a filter housing according to one embodiment.
Figure 4:
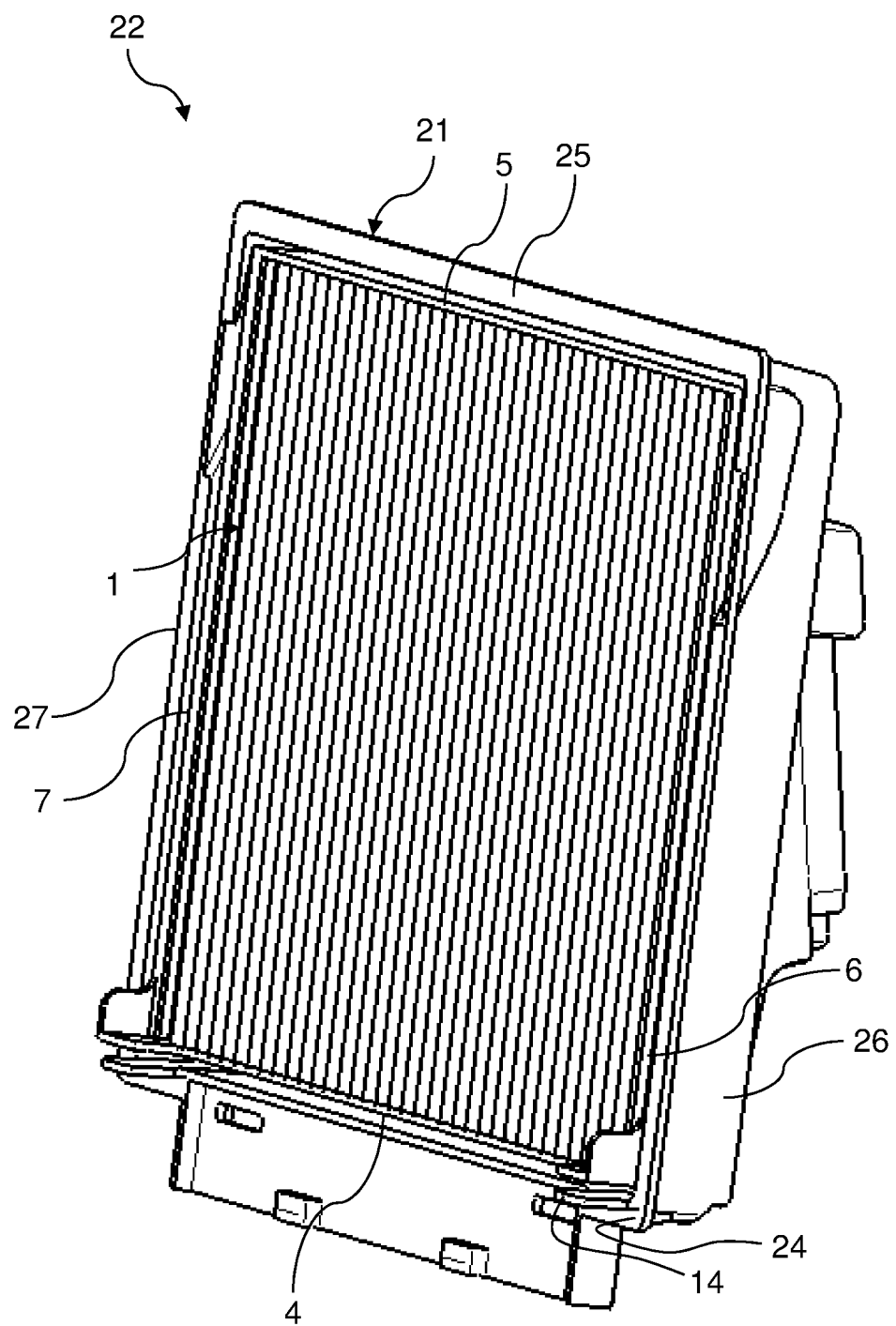
FIG. 4 is a filter assembly including the filter element of FIG. 1 and the filter housing of FIG. 2 in a mounted state.

FIG. 2 shows a filter housing 21 (filter receptacle) which together with the cabin air filter 1 in the mounted state forms the filter assembly 22 illustrated in FIG. 4.

The filter housing 21 includes a housing frame 23 which is formed, in accordance with the filter element frame 3, with longitudinal profiles 24, 25 and transverse profiles 26, 27. To the rear, a shaped part 28 with an opening 29 is adjoining the housing frame 23. By means of the opening 29, the air supply of clean air can be realized, for example, to a cabin of a truck. The shaped part 28 can be formed with recesses 30 which receive screws by means of which the filter housing 21 can be screwed to a partition panel of a truck. The filter housing 21 as well as the filter element 1 are thus vertically oriented in the mounted state or in operation, as shown in FIG. 4. The shaped part 28 can be formed as one piece together with the housing frame 23. In particular, the filter housing 21 can be manufactured as a monolithic injection-molded plastic part.

The transverse profiles 26, 27 each can be formed with a receiving element in the form of a guide recess 31. The guide recess 31 includes an open end (opening) 32 for insertion of a correlated engagement element 12 of the cabin air filter 1. In the guide recess 31 a correlated engagement element 12 glides into a closed area (closed end) 33 which is formed with a curved portion 34. The curved portion 34 forms a pivot point together with a correlated engagement element 12. The labyrinth-type profile, as can be seen in FIG. 1A, can be made of, for example, five straight sections 44, 45, 46, 47, 48 that are angularly connected with each other approximately to an S-shape. Also, the labyrinth-type profile can have a projection 49 which defines a maximally possible pivot position indicated in FIGS. 1A and 1B. In the maximal pivot position, the projection 49 impacts against the upper limit section 50 of the receiving element (guide recess 31). Accordingly, during installation and/or removal, positions of the cabin air filter 1 relative to the filter housing 21 can be avoided which could lead to the cabin air filter 1 being damaged, for example, by adjoining components in particular in the area of the partition panel. FIGS. 1A and 1B differ with regard to the arrangement of the projection 49, i.e., horizontal (FIG. 1A) and vertical (FIG. 1B), respectively, relative to the areal extension of the cabin air filter 1.

Accordingly, two pivot points are provided on a respective transverse profile 26, 27 and define a pivot axis 35. About the pivot axis 35, the filter element 1 is pivoted relative to the filter housing 21 after insertion of the engagement elements 12 into the closed areas 33 of the respective transverse profiles 26, 27. Finally, the snap hooks 14 engage a respective locking means (locking element) 36. The locking means 36 are formed on the longitudinal profile 24. In this context, the projections 17 by means of the insertion ramps 18 glide across the locking means 36 whereby the respective snap hook 14 is deformed. The snap-in action is realized in pivot direction 37 (second pivot direction) about pivot axis 35. After locking of the snap hook 14 with a respective raised portion 36, pivoting in the opposite direction 38 (first pivot direction) is blocked. Incidentally, the filter element frame 3 is then also resting on corresponding stops 39 or other contact surfaces of the filter housing 21 so that also further pivoting in the second pivot direction 37 is blocked. As a whole, an attachment of the cabin air filter 1 on the filter housing 21 in all six degrees of freedom is realized.

Along the longitudinal profile 4, three grooves 40 can be provided, for example. The spacing 42 between a first groove 40 and a second groove 40 can be different from a spacing 43 between the second groove 40 and a third groove 40, for example. The webs 41 on the longitudinal profile 24 or on the filter housing 21 are also arranged correspondingly. Upon pivoting of the cabin air filter 1 into the filter housing 21 in the second direction 37, the webs 41 are inserted into the grooves 40. Accordingly, a poka-yoke effect can be achieved: Only a cabin air filter 1 of the correct type can be installed in the filter housing 21. Also, the webs 41 can reinforce the filter housing 21.

For releasing or demounting the cabin air filter 1, it is only necessary to actuate the snap hooks 14. Subsequently, the projections 17 are disengaged from the locking means 36 so that the cabin air filter 1 can be pivoted about the pivot axis 35 in the first pivot direction 38. Subsequently, when the longitudinal profile 4 of the filter element frame 3 has been pivoted out of the housing frame 23, the engagement elements 12 can be moved out of the receiving elements (guide recesses 31) through the openings 32.

Even though the invention has been described with the aid of preferred embodiments, the invention is not limited thereto in any way but can be modified in many ways.

What is claimed is:

1. A cabin air filter comprising:
   a filter medium;
   a filter element frame framing the filter medium and configured to attach the cabin air filter to a filter housing;
   the filter element frame including
      two longitudinal profiles arranged parallel to each other; and
      two transverse profiles arranged parallel to each other and arranged perpendicular to the two longitudinal profiles, at least one engagement element configured to engage pivotably at least one receiving element of the filter housing for pivoting the cabin air filter relative to the filter housing about a pivot axis;

wherein the at least one engagement element is provided at an end section of the transverse profiles and wherein the engagement element extends perpendicularly away from a plane comprising an exterior surface of the transverse profile;

wherein the at least one engagement element is a guide element and the at least one receiving element is a guide recess;

the filter element frame further including at least one snap hook configured to lock with at least one locking means of the filter housing for blocking a pivoting action of the cabin air filter relative to the filter housing at least in a first direction about the pivot axis;

wherein two of the at least one engagement element are provided, wherein at the end sections of each one of the two transverse profiles one of the two engagement elements is provided, and wherein at least one groove is provided along a longitudinal profile.

2. The cabin air filter according to claim 1, wherein the at least one snap hook is configured to lock with the at least one locking means upon pivoting of the cabin air filter about the pivot axis in a second direction opposite to the first direction.

3. The cabin air filter according to claim 1, wherein two of the at least one snap hook are provided and arranged on one of the two longitudinal profiles.

4. The cabin air filter according to claim 1, wherein the at least one engagement element of the filter element frame is formed of a plurality of engagement element sections that are angularly connected with each other end to end forming an S-shaped labyrinth-type profile in the at least one engagement element.

5. The cabin air filter according to claim 1, wherein the at least one engagement element is a guide pin.

6. A filter assembly comprising:

a cabin air filter according to claim 1;

a filter housing, comprising:

two longitudinal profile walls joined to traverse profile walls forming a receiving frame into which the cabin air filter is installable, wherein the two longitudinal profiles of the cabin air filter frame are each positioned at and facing a respective inner surface of a respective longitudinal profile wall of the receiving frame, the inner surface facing a correlated longitudinal profile of the cabin air filter;

at least one guide recess is formed into the inner surface of the longitudinal profile walls of the filter housing, the at least one guide recess configured to receive the at least one engagement element of the filter element frame of the cabin air filter, the at least one guide recess interacting with the at least one engagement element to define the pivot axis, enabling the cabin air filter to pivot relative to the filter housing when mounting or demounting the cabin air filter in the filter housing.

7. The filter assembly according to claim 6, wherein the at least one engagement element of the cabin air filter is formed of a plurality of engagement element sections that are angularly connected with each other end to end forming an S-shaped labyrinth-type profile in the at least one engagement element.

8. The filter assembly according to claim 6, wherein the at least one engagement element of the cabin air filter is a guide pin.

\* \* \* \* \*